(12) United States Patent
Pan et al.

(10) Patent No.: US 12,117,996 B2
(45) Date of Patent: Oct. 15, 2024

(54) SCHEMA-FREE STATIC QUERY TEMPLATE

(71) Applicant: TigerGraph, Inc., Redwood City, CA (US)

(72) Inventors: Yiming Pan, Foster City, CA (US); Mingxi Wu, San Mateo, CA (US)

(73) Assignee: TigerGraph, Inc., Redwood City, CA (US)

( * ) Notice: Subject to any disclaimer, the term of this patent is extended or adjusted under 35 U.S.C. 154(b) by 1 day.

(21) Appl. No.: 18/053,832

(22) Filed: Nov. 9, 2022

(65) Prior Publication Data

US 2024/0152507 A1  May 9, 2024

(51) Int. Cl.
*G06F 16/242* (2019.01)
*G06F 16/21* (2019.01)
*G06F 16/2455* (2019.01)

(52) U.S. Cl.
CPC .......... *G06F 16/242* (2019.01); *G06F 16/213* (2019.01); *G06F 16/2455* (2019.01)

(58) Field of Classification Search
CPC ... G06F 16/242; G06F 16/213; G06F 16/2455
See application file for complete search history.

(56) References Cited

U.S. PATENT DOCUMENTS

| | | | |
|---|---|---|---|
| 2013/0117288 A1* | 5/2013 | De Smet | G06F 9/4488 707/E17.062 |
| 2014/0282356 A1* | 9/2014 | Mills | G06F 8/75 717/101 |
| 2015/0242641 A1* | 8/2015 | Li | G16Z 99/00 713/193 |
| 2020/0151190 A1* | 5/2020 | Asai | G06F 16/2246 |
| 2022/0129451 A1* | 4/2022 | Haprian | G06F 16/252 |
| 2022/0222259 A1* | 7/2022 | Lee | G06F 16/24556 |
| 2022/0374420 A1* | 11/2022 | Relan | G06F 16/24522 |

* cited by examiner

*Primary Examiner* — Cam Y T Truong
(74) *Attorney, Agent, or Firm* — Jonathan M. Waldman

(57) ABSTRACT

A schema-free static query template improves schema-free graph query performance and runtime stability. A user can customize a generated graph query while detecting a query tampering state. Schema-free query templates, which have been compile-time type/syntax/semantic checked by a dummy schema, are installed. The templates are called as if they are functions with their selected graph schema vertex types and edge types. The invocation generates a static query which uses input metadata to instantiate a static query, and goes through type/syntax/semantic checks to capture any input errors at compile time. If there is no error found during compile time, a query binary is generated only containing the metadata related to the parameters and sent to a query engine for execution. If a user later invokes the same query with the same metadata, the compiler matches the generated previous query, bypasses compilation, and goes directly to the existing binary code.

15 Claims, 6 Drawing Sheets

```
CREATE QUERY tg_wcc (SET<STRING> v_type, SET<STRING> e_type, INT output_limit = 100,
BOOL print_accum = TRUE, STRING result_attr = "", STRING file_path = "") SYNTAX V1 {

/*
This query identifies the Connected Components (undirected edges). When finished, each
vertex is assigned an INT label = its component ID number.
  v_type: vertex types to traverse       print_accum: print JSON output
  e_type: edge types to traverse         result_attr: INT attr to store results to
  file_path: file to write CSV output to    display_edges: output edges for visualization
  output_limit: max #vertices to output (-1 = all)
*/

MinAccum<INT> @min_cc_id = 0;    //each vertex's tentative component id
MapAccum<INT, INT> @@comp_sizes_map;
MapAccum<INT, ListAccum<INT>> @@comp_group_by_size_map;
FILE f(file_path);

Start = {v_type};

# Initialize: Label each vertex with its own internal ID
S = SELECT x
    FROM Start:x
    POST-ACCUM x.@min_cc_id = getvid(x);

# Propagate smaller internal IDs until no more ID changes can be Done
WHILE (S.size()>0) DO
   S = SELECT t
       FROM S:s -(e_type:e)- v_type:t
            ACCUM t.@min_cc_id += s.@min_cc_id // If s has smaller id than t, copy the id to t
            HAVING t.@min_cc_id != t.@min_cc_id';
END;
IF file_path != "" THEN
   f.println("Vertex_ID","Component_ID");
END;

Start = {v_type};
Start = SELECT s
    FROM Start:s
         POST-ACCUM
            IF result_attr != "" THEN
               s.setAttr(result_attr, s.@min_cc_id)
            END, IF print_accum THEN
               @@comp_sizes_map += (s.@min_cc_id -> 1)
            END, IF file_path != "" THEN
               f.println(s, s.@min_cc_id)
            END;
IF print_accum THEN
   IF output_limit >= 0 THEN
      Start = SELECT s
          FROM Start:s
          LIMIT output_limit;
   END;
   FOREACH (compId,size) IN @@comp_sizes_map DO
      @@comp_group_by_size_map += (size -> compId);
   END;
   PRINT @@comp_group_by_size_map;
   PRINT @@comp_sizes_map as sizes;
   PRINT Start[Start.@min_cc_id];
END;
}
```

*FIG. 1*
*PRIOR ART*

SCHEMA-FREE STATIC QUERY TEMPLATE

BACKGROUND

For several decades, the dominant model for organizing and storing data in a database has been a relational model. The relational model organizes data into one or more tables (or "relations") of columns and rows.

A more recent, but less developed, database model is a graph model. Compared with the relational model, the graph model is often faster for associative data sets and is a powerful tool for graph-like queries, such as computing the shortest path between two nodes in the graph. Other graph-like queries, such as diameter computations or community detection of a graph, can be performed over a graph database in a natural way.

Many graph algorithms can be written in the GSQL® query language, TigerGraph, Redwood City, California. GSQL is a strong type query language, meaning that the query writer needs to know the data schema beforehand.

However, there is a real-life need to write queries without knowing the user schema. For example, many users would like to be provided with graph algorithm libraries. However, their schema is not known when those graph algorithm queries are written.

To solve this problem, GSQL was extended to allow user to write a query without knowing the schema beforehand. This is referred to as dynamic GSQL.

Dynamic GSQL allows a user to write a query in a schema-free way. A schema-free example 100 is shown in FIG. 1. In the example 100 of FIG. 1, it is noted that vertex type and edge type information is specified as the query parameter, which is unknown at compile time. At runtime, the invoker will pass the vertex type or edge type metadata as parameter values to the query, and the query will do runtime type check and data fetching. This is somewhat similar to the runtime interpretation of the query, but the query logic is programmed offline and shipped as a library to the user. This non-metadata version of GSQL is referred to as "dynamic query" format.

In FIG. 1, the dynamic query format parameterizes every vertex or edge type, meaning they are written in a schema-freeway. The dynamic query format uses parameters to drive the graph algorithm flow, and those metadata parameters are passed in as parameters at runtime, and the engine will interpret the metadata, and do runtime type check and data fetching.

Dynamic GSQL query problems include runtime user input error in which the generated query may hit a runtime error if the user input schema parameter is wrong. This is because a query block vertex/edge type positions are filled with query runtime parameters, and attributes are obtained or set with runtime parameters, e.g., by getAttr( ), setAttr( ) as in:

Start={v_type}; //v_type is a string parameter of the query,
Start=SELECT s
 FROM Start:s -(e_type:e)-v_type:t //e_type and v_type are string parameters of the query,
  ACCUM s.@sum_total_wt+=e.getAttr(wt_attr, "FLOAT");//wt_attr are runtime query parameter.

Additionally, customer installations of dynamic query in their environment will use their schema, which could be very expensive, because customer schema may contain hundreds of vertex types and edge types. Type check, semantic check, and syntax check are done using the customer graph schema. If the schema size is large, it will take long time to do type check, semantic check, and syntax check, because it considers all possible combinations of runtime metadata input, which is huge.

Moreover, performance is subpar. Due to the runtime interpretation of meta data parameters, there will be a performance hit.

Thus, in a conventional technique, a user writes a generic schema-free graph query procedure and generates C++ UDF code based on customer schema, compiles it to a dynamic library, and loads the library into the engine. At runtime, the dynamic library takes in schema type as parameters, does runtime type-check, and semi-interprets the query. This is flexible and allows a generic query to be installed on any graph schema at compile time, and can be faster than an interpreted engine as it uses generated code. However, performance is not optimal because each query invocation requires runtime type check. Moreover, it is not easily customizable because it is schema-free, which provides almost zero metadata context in the query text. Thus, it is hard to read, not stable, and difficult to debug. Sometimes, due to a user's wrong input of the metadata of the graph, the query has to throw a runtime error. Additionally, compile time type and semantic check is expensive when the graph schema has hundreds of vertex/edge types because the compiler will use all the possible vertex/edge types to replace the dynamic part and do type and semantic check. Also, code generation adds too many branching statements.

Another conventional technique is an interpret engine method, which is like a traditional RDBMS engine. This has a static code analysis benefit—capture semantic and type check error before query plan is generated and sent to the interpreted engine to execute. This is easily customizable as everything is known at compile time. However, runtime performance is slow.

It is with respect to these and other considerations that the various aspects and embodiments of the present disclosure are presented.

SUMMARY

To overcome the dynamic query shortcomings, systems and methods are directed to a schema-free static query template and optimizing schema-free graph query performance and improving runtime stability. Systems and methods allow a user to customize a generated graph query while detecting a query tampering state.

In an embodiment, a method comprises: creating a query template using a dynamic query syntax for a graph algorithm, wherein the query template is schema-free and without a query binary code; and storing the query template in a computer memory.

In an embodiment, a system comprises: a query template generator configured to create a query template using a dynamic query syntax for a graph algorithm, wherein the query template is schema-free and without a query binary code; and a computer memory configured to store the query template.

In an embodiment, a system comprises: at least one processor; and a non-transitory computer readable medium comprising instructions that, when executed by the at least one processor, cause the system to: create a query template using a dynamic query syntax for a graph algorithm, wherein the query template is schema-free and without a query binary code; and store the query template in a computer memory.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings:

FIG. 1 is an illustration of an example of dynamic GSQL;

DETAILED DESCRIPTION

Challenges of a dynamic query include, for example: (1) a user needing to use their schema to install the dynamic query, which is very expensive if their schema is large; (2) each invocation of the installed dynamic query will re-interpret the input parameters, as it is schema-free, even when the user just changes the tuning parameter of a graph algorithms; and (3) the performance is subpar because the query binary generating needs to consider all possible metadata input, and interpret the runtime input at runtime. Based on the above challenges, systems and methods described herein provide a schema-free static query template approach.

In accordance with this approach, in some implementations and as described further herein, schema-free query templates, which have been compile-time type/syntax/semantic checked by a dummy schema, are saved in storage (e.g., installed in a database). A user can call the templates as if the templates are functions with their selected graph schema vertex types and edge types. The invocation generates a static query which uses the user input metadata to instantiate a static query, and goes through all type/syntax/semantic checks to capture any user input errors at compile time. When there is no error found during compile time of the generated static query, it is used to generate a query binary only containing the metadata related to the parameters and sent to a query engine for execution. When a user later invokes the same query with the same metadata, the compiler matches the generated previous query, bypasses compilation, and goes directly to the existing binary code. This technique makes the query template pass the correctness check, captures the user input error at compile time, and matches the existing query using the metadata input and query name. This provides a very stable performing solution for a graph query library.

Figure 2:
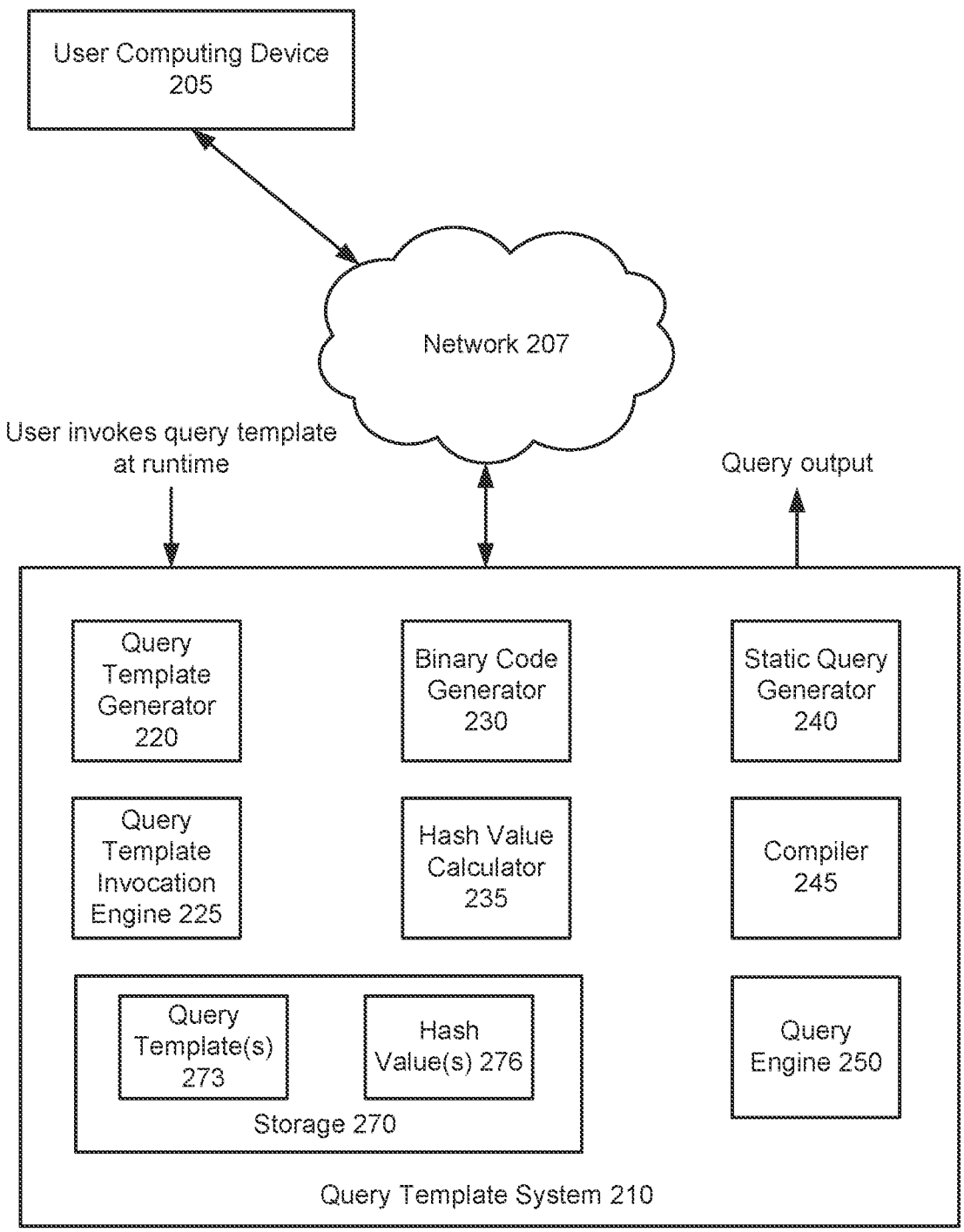
FIG. 2 is an illustration of an exemplary environment for a schema-free static query template.
Figure 3:
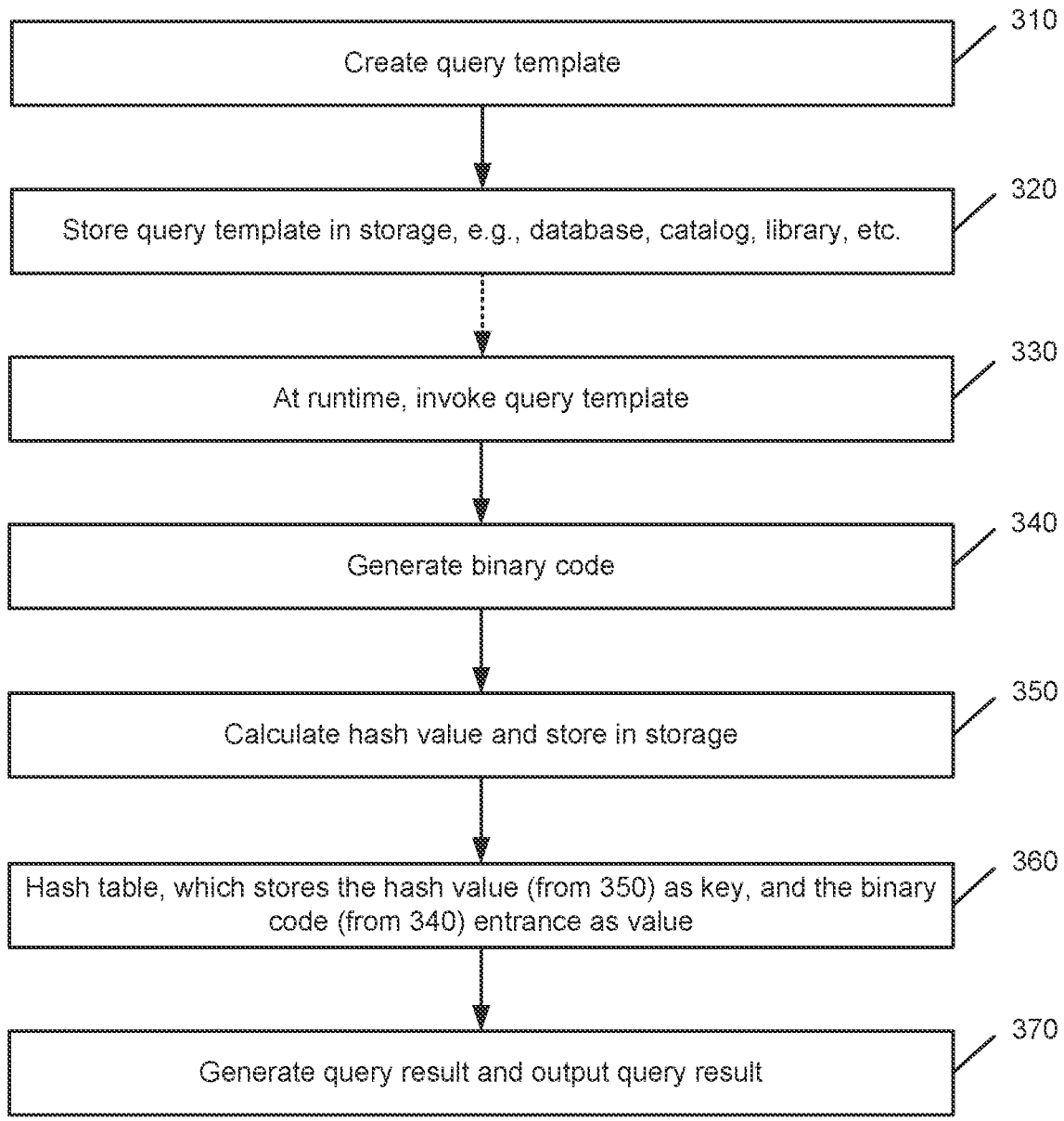
FIG. 3 is an operational flow of an implementation of a schema-free static query template method.

FIG. 2 is an illustration of an exemplary environment 200 for a schema-free static query template, and FIG. 3 is an operational flow of an implementation of a schema-free static query template method 300. The method may be implemented in the environment 200 in some implementations.

As shown, a user computing device 205 is in communication with a query template system 210 via a network 207. The network 207 may be a variety of network types including, but not limited to, the public switched telephone network (PSTN), a cellular telephone network, and a packet switched network (e.g., the Internet). Although only one user computing device 205 and one query template system 210 are shown in FIG. 2, there is no limit to the number of query template systems and user computing devices that may be supported.

Figure 6:
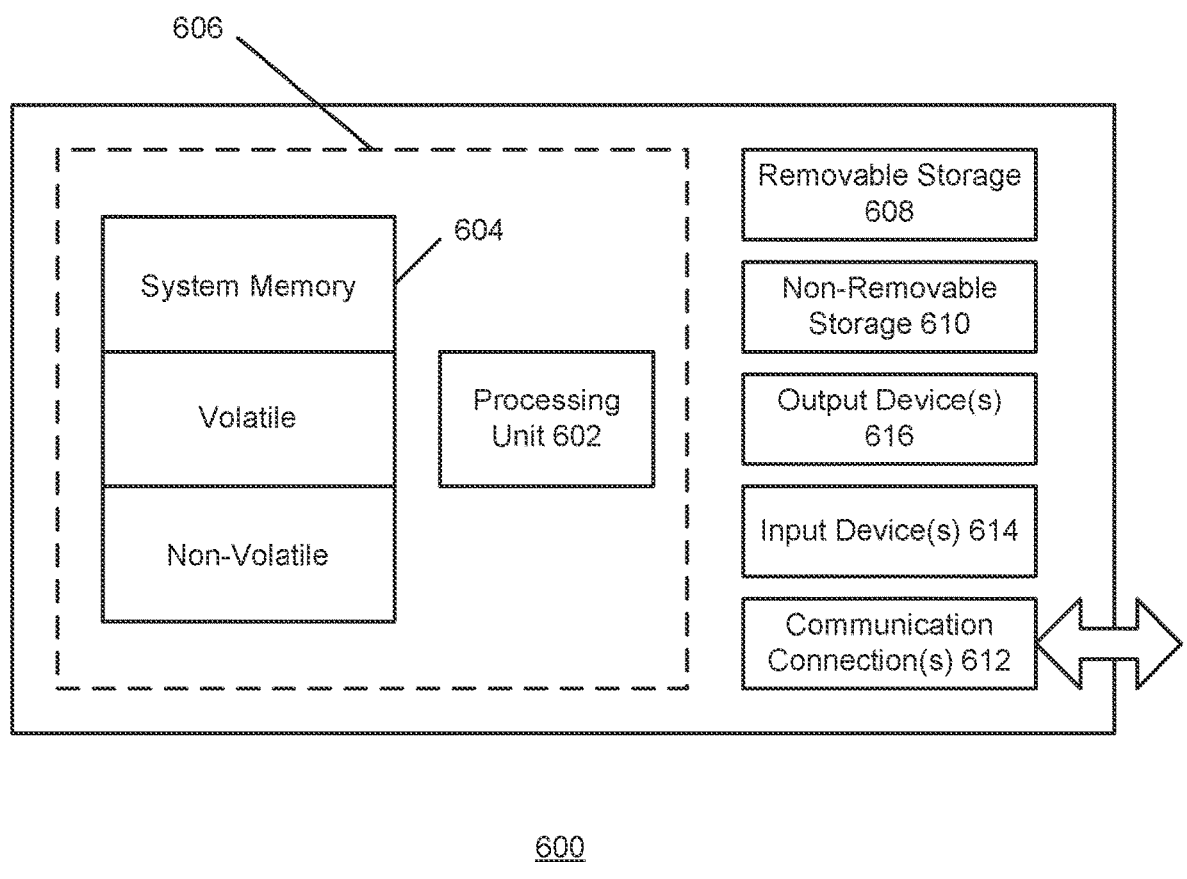
FIG. 6 shows an exemplary computing environment in which example embodiments and aspects may be implemented.

The user computing device 205 and the query template system 210 may each be implemented using a variety of computing devices such as smartphones, desktop computers, laptop computers, tablets, set top boxes, vehicle navigation systems, and video game consoles. Other types of computing devices may be supported. A suitable computing device is illustrated in FIG. 6 as the computing device 600. In some implementations, the user computing device 205 and the query template system 210 may reside on, or be integral to, the same computing device, and may be in communication with each other without a network connection.

The query template system 210 comprises a query template generator 220, a query template invocation engine 225, a binary code generator 230, a hash value calculator, a static query generator 240, a compiler 245, a query engine 250, and storage 270 (e.g., a computer memory or storage). As described further herein, at runtime, a user invokes a query template and a response to the query is outputted.

At 310, a query template is created, e.g., by the query template generator 220. A dynamic query syntax is used to create a query template, e.g., for each graph algorithm identified, inputted, or otherwise provided by a user, a computing device, or from storage. The created query template is similar to a dynamic query, except the query binary code is not generated. Instead, each query template is stored as a template in storage, such as in a database catalog. Thus, a schema-free query template is used to write a graph query template, which goes through a semantic/type check and a syntax check via a dummy graph (controlled complexity). No code is generated for the template.

In an implementation, the query template syntax is the same as a common GSQL query, except excluding the "FOR GRAPH" syntax part and the "DISTRIBUTED" syntax part, for example. Additionally, a query template uses parameters for all vertex/edge type pattern positions.

It is noted that the created query template is usable for both global and local graphs. An implementation of a method 400 of creating a query template is described further herein with respect to FIG. 4.

At 320, the query template is stored in a computer memory or storage, such as in a query template(s) storage 273 of the storage 270. In some implementations, the query template(s) storage 273 may comprise a database. The query template(s) may be stored in a catalog (e.g., in package location of catalog) or in a library, in some implementations. For example, graph algorithms may be written as static query templates and classified into packages. Packages may be imported by a GSQL command, for example, depending on the implementation.

At some point, runtime is initiated at 330 and a query template is invoked. In an implementation, the query template is invoked by the query template invocation engine 225. In some implementations, at the first invocation time, a static query form of the query is generated using a string replacement technique based on the query input parameters. As described further herein, code generation is then performed, with compilation to a dynamic library, and loading into the query engine. An implementation of a method 500 of invoking a query template is described further with respect to FIG. 5.

At 340, binary code is generated. In an implementation, the binary code is generated by the binary code generator 230. After the template is instantiated, and compile time checked, binary code is generated for this static query, which is more efficient than the previous runtime schema-interpreted binary code, because the static query code only contains the necessary metadata, not the entire schema branching instructions.

At 350, a hash value is calculated (e.g., by the hash value calculator 235) and stored in storage, such as in a hash value(s) storage 276 of the storage 270. In an implementation, the query signature with the generated query string hash coded is stored in storage. The user may customize the generated query string, which may then be stored in storage.

For example, in an implementation, calculate a hash value for each generated query using only the metadata parameter values and the query name, e.g., CALL gdbms_algo.community.tg_louvain(["person", "comments" ], ["reply", "like" ], "weight", 10, "cid", " ", FALSE). The query name and the parameters that contain metadata (e.g., "gdbms_algo.community.tg_louvain(["person", "comments" ], ["reply", "like" ]") are used to compute a hash value. Then, next time, when a user calls the same query but changes the non-metadata parameter values, the generated query is used that matches the hash value. For example, continuing with the example above, if only the "10" is changed to "100" (so it reads CALL gdbms_algo.community.tg_louvain(["person", "comments"], ["reply", "like"], "weight", 100, "cid", " ", FALSE), the query template will not be instantiated again. Instead, it uses the "gdbms_algo.community.tg_louvain(["person", "comments" ], ["reply", "like" ]" to generate a hash value and finds that the catalog already contains a query with the same metadata from an earlier creation, then it will invoke that query with the set of parameters indicated directly above. This cache technique will address a lot of data scientist tuning needs while keeping their metadata unchanged.

At 360, the hash value is used to find the corresponding generated query binary. The hash value is a signature representative of the input metadata and query name. A hash table stores the hash value (from 350) as a key, and the binary code (from 340) entrance as a value. This hash table is a cache for quickly looking up matching generated binary code.

At 370, a query result is generated and outputted. In an implementation, the query is sent to the query engine 250 which generates and outputs the query result. The query result may be outputted to the user computing device 205 in some implementations.

Figure 4:
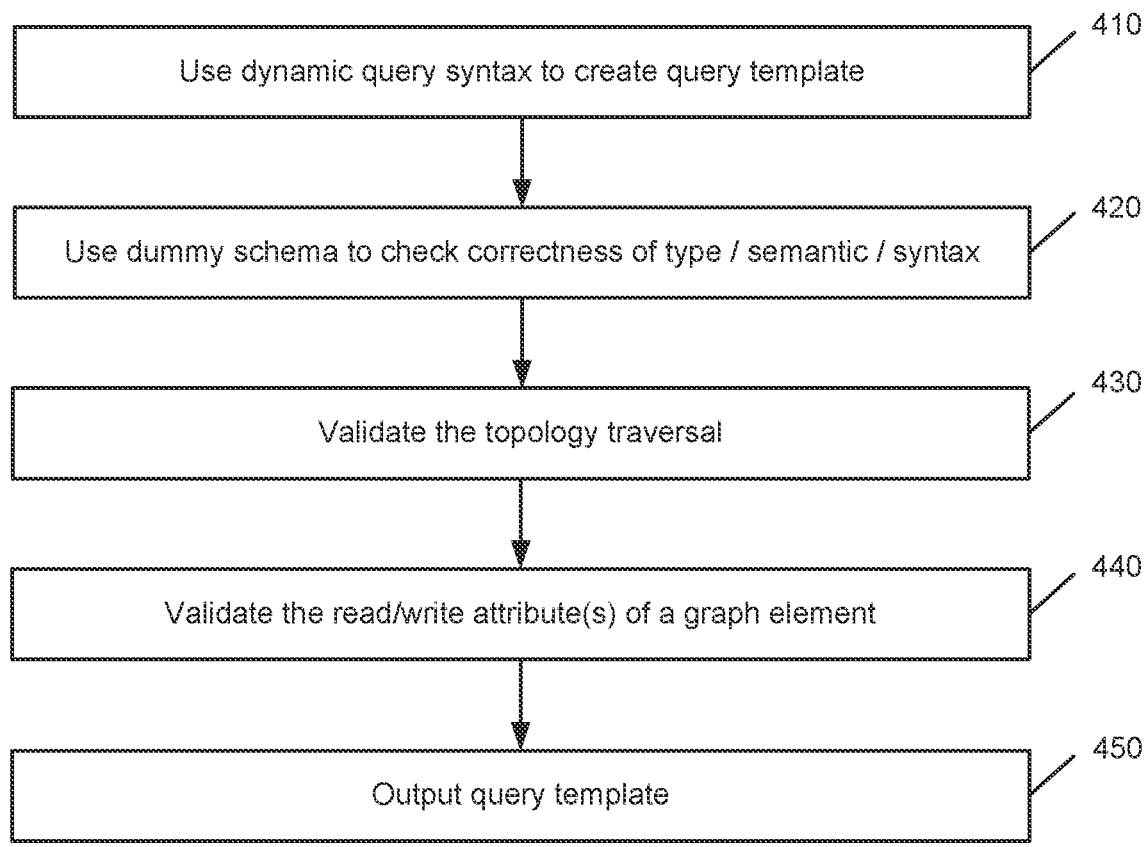
FIG. 4 is an operational flow of an implementation of a method of creating a query template.

FIG. 4 is an operational flow of an implementation of a method 400 of creating a query template. At least some aspects and/or operations of the method 400 may be performed by the query template generator 220 of the query template system 210 in some implementations.

At 410, a query template is created using dynamic query syntax.

At 420, a dummy schema is used to check the correctness of type, semantic, and syntax. When a user writes or otherwise creates a template, each query template will use a dummy schema to do type/semantic/syntax check to make sure it is correct. The dummy graph schema has the minimum information that a graph algorithm uses, e.g., one vertex type V(id STRING PRIMARY KEY, att INT) and one undirected edge E (FROM v, TO v, att INT).

Most graph algorithms, such as page rank, weakly community detection, etc. operate on the graph topology (vertex and edges) and sometimes they store values on attributes of the graph elements (vertex/edge).

The above generic schema can help a dynamic query to validate the graph algorithm's need. The minimum vertex and edge type help validate the topology traversal. The single attribute on the vertex/edge type helps validate the read/write attribute of a graph element when the graph algorithm wants to leave some side-effect on the graph.

This dummy graph schema works instead of a customer complex graph schema because a graph algorithm uses traversal topology and sets some side effects on the graph elements. Regardless of the number of vertex types or edges that are used to call the dynamic query, the syntax/type check pattern is the same. This solves the dynamic query installation issue when customer schema size is big.

In an implementation, create a transient dummy graph in the catalog:
one vertex type V(id STRING PRIMARY KEY, att INT)
one undirected edge E (FROM v, TO v, att INT)

The dummy graph is used to enable the query template to go through a semantic check and a type check, instantiate each of metadata parameters with all possible catalog values, and do a type check and a semantic check. This technique obviates the dynamic query type check complexity in the past, where the catalog has hundreds of vertex/edge types, and in which the type check and the semantic check use all the possible vertex/edge types to do the type check and the semantic check, which is sometimes very slow or generate an OOM (out of memory) indication.

Note that the dummy graph works because the graph algorithms use topology and edge/vertex weight attribute only. If the template method is opened up for an end user to allow the end user to customize any domain query template, the end user would be allowed to code a simple dummy graph that includes the necessary attribute type.

At 430, the topology traversal is validated.

At 440, the read/write attribute(s) of a graph element is validated.

At 450, the query template is outputted. In some implementations, the query template is outputted to storage, such as the storage 270 described with respect to operation 320.

Figure 5:
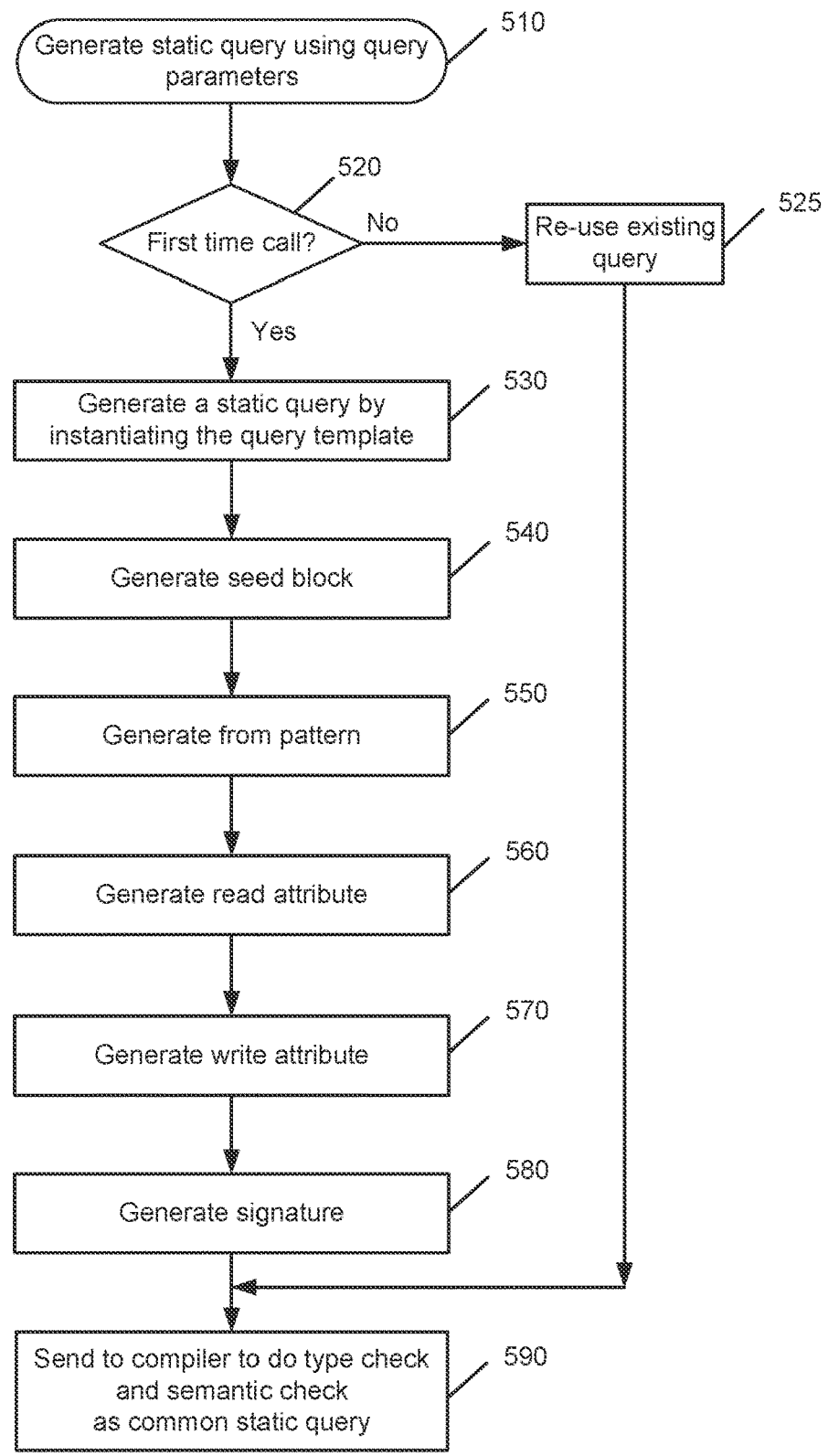
FIG. 5 is an operational flow of an implementation of a method of invoking a query template.

FIG. 5 is an operational flow of an implementation of a method 500 of invoking a query template. At least some aspects and/or operations of the method 500 may be performed by the query template invocation engine 225 and/or the static query generator 240 of the query template system 210 in some implementations.

At 510, the call is made to generate a static query using query parameters. When a user invokes the query template at runtime, the compiler generates a static query using the query parameters. If it is a first time call, a static query is generated by instantiating the query template.

It is determined at 520 whether this is a first time call for the query or there is a matching query hash value which encodes "query name+metadata parameter+query text". When it is not a first time call, then an existing query is re-used at 525, and process continues at 590. Thus, when there is a matching query hash value (a cache hit), the cache entry is reused to obviate the instantiation.

When it is determined at 520 to be a first time call, then a static query is generated at 530 by instantiating the query template. The static query may be generated by the static query generator 240 in some implementations.

At 540, a seed block is generated. For example, for a seed block, check if the seed block contains a parameter, if YES, replace it as: V={v_type}==>V={person.*, comments.*}.

At 550, a FROM pattern is generated. For example, for a FROM pattern, check Src:s-(E:e)-Tgt:t, parameter is in the edge pattern or the target vertex pattern, do string replacement with vertical bar as separator for set of strings: (E:e)==>((reply|like):e).

At 560, a read attribute is generated. For example, for a read attribute, alias.GetAttr(attName, type)⇒replace with "alias.weight" (the input parameter).

At 570, a write attribute is generated. For example, for a write attribute, keep alias.SetAttr(attName, value) as it is, because it is a side effect of the query, the user may change it at invocation time for different runs. So it is treated as a tunable parameter.

At 580, a signature is generated. For example, a signature is a hash value based on the graph algorithm name and the metadata parameters. The signature can subsequently be used to determine whether an existing query can be re-used.

At 590, after static query is instantiated, the query is sent to a compiler (e.g., the compiler 245) to do a type check and semantic check as a common static query. This captures a user input error at compile time and prevents runtime errors. The resulting query is then sent for further processing, e.g., at operation 340. In an implementation, the query has a "distributed" keyword to cover both single and distributed cluster environments.

After the static query is generated, in some implementations, it is made visible in a catalog, e.g., with a name algorithm such as Name_hashvalue( ). A user can use show query QueryName to seethe GSQL text, and copy it to somewhere to customize it. After customization, when the user wants to replace the existing query of the same name, GSQL shows a warning that the query has been tampered because the computed hash value of the GSQL text is now different. If the user calls the same graph algorithm with a different set of attribute names for setAttribute( ) and/or a different set of constant parameters, then the previous installed query is matched and invoked, thus obviating the install query operation.

As another example in an implementation, at query invocation time, check the signature (encode "function name+ metadata parameter+query text"). If it exists, call the existing query with new constant tuning parameters. If it does not exist, then create a new static query by replacing the dynamic part and generate new static query, replacing the metadata part by parameters, and keep the constant parameters as query parameters.

For the seed block, check if seed block contains parameter, if YES, replace it as: e.g., V={v_type}==>V={Person.*}.

For the FROM clause, check A:b-(C:c)-D:d, parameter is in the edge pattern or the target vertex pattern, do string replacement with vertical bar as separator for set of strings: e.g., C:c==>(Like|Friendship):c.

Regarding attributes, for the read attribute alias.GetAttr (attName, type): replace with "alias.weight" (the input parameter attName="weight"). For the write attribute, keep alias.SetAttr(attName, value) as it is because it is a side effect of the query, the user may change attName at invocation time for different runs. So treat it as a tunable parameter.

The techniques provided herein provide advantages including: a static code analysis benefit in which semantics and type check errors are captured before a query is sent to the query engine, resulting in a very stable system; higher performance and more concise code generation than the prior approaches; easily customizable with all type information in the generated query with query customization detection; type check and semantic check for the query template is constant time, because it uses a dummy controlled schema. It is noted that if the main metadata parameters change at invocation time, the static query analysis, code generation, compilation and dynamic library loading operations need to be repeated.

FIG. 6 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 6, an exemplary system for implementing aspects described herein includes a computing device, such as computing device 600. In its most basic configuration, computing device 600 typically includes at least one processing unit 602 and memory 604. Depending on the exact configuration and type of computing device, memory 604 may be volatile (such as random access memory (RAM)), non-volatile (such as read-only memory (ROM), flash memory, etc.), or some combination of the two. This most basic configuration is illustrated in FIG. 6 by dashed line 606.

Computing device 600 may have additional features/functionality. For example, computing device 600 may include additional storage (removable and/or non-removable) including, but not limited to, magnetic or optical disks or tape. Such additional storage is illustrated in FIG. 6 by removable storage 608 and non-removable storage 610.

Computing device 600 typically includes a variety of computer readable media. Computer readable media can be any available media that can be accessed by the device 600 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 604, removable storage 608, and non-removable storage 610 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of computing device 600.

Computing device 600 may contain communication connection(s) 612 that allow the device to communicate with other devices. Computing device 600 may also have input device(s) 614 such as a keyboard, mouse, pen, voice input device, touch input device, etc. Output device(s) 616 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

In an implementation, a method comprises: creating a query template using a dynamic query syntax for a graph algorithm, wherein the query template is schema-free and without a query binary code; and storing the query template in a computer memory.

Implementations may include some or all of the following features. The query template uses parameters for all vertex/edge type pattern positions. The method further comprises using a dummy schema to check correctness of type, semantic, and syntax of the query template. The dummy graph schema has the minimum information that the graph algorithm uses. The method further comprises validating a topology traversal, validating a read attribute of a graph element, and validating a write attribute of the graph element. The method further comprises invoking the query template. Invoking the query template is performed at runtime. Invoking the query template comprises receiving a call for generating a static query. The method further comprises determining when the call is a first time call for the static query, and if so, then creating the static query, and otherwise retrieving the static query from a storage. The method further comprises sending the static query to a compiler to do a type check and a semantic check. The method further comprises: generating a binary code for the query template; calculating a hash value encoding a query name, a metadata parameter, and a query text; and storing the hash value in a storage. The method further comprises: providing a query based on the query template to a query engine; and outputting a query result from the query engine.

In an implementation, a system comprises: a query template generator configured to create a query template using a dynamic query syntax for a graph algorithm, wherein the query template is schema-free and without a query binary code; and a computer memory configured to store the query template.

Implementations may include some or all of the following features. The system further comprises a query template invocation engine configured to invoke the query template. Invoking the query template is performed at runtime and the system further comprises a static query generator configured to receive a call for generating a static query and create the static query. The system further comprises a compiler configured to do a type check and a semantic check on the static query. The system further comprises: a binary code generator configured to generate a binary code for the query template; a hash value calculator configured to calculate a hash value of the query template name and the query metadata, and the static query text; and a query engine configured to receive a query based on the query template to a query engine, and output a query result.

In an implementation, a system comprises: at least one processor; and a non-transitory computer readable medium comprising instructions that, when executed by the at least one processor, cause the system to: create a query template using a dynamic query syntax for a graph algorithm, wherein the query template is schema-free and without a query binary code; and store the query template in a computer memory.

Implementations may include some or all of the following features. The system further comprises instructions that, when executed by the at least one processor, cause the system to invoke the query template, wherein invoking the query template comprises receiving a call for generating a static query, and to determine when the call is a first time call for the static query, and if so, then create the static query, and otherwise retrieve the static query from a storage. The system further comprises instructions that, when executed by the at least one processor, cause the system to send the static query to a compiler to do a type check and a semantic check; generate a binary code for the query template; calculate a hash value for the query template invocation parameters; store the hash value in a storage; and generate and output a result based on a query based on the query template.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method comprising:
   creating, by a query template generator executed on a computer system, a query template using a dynamic query syntax for a graph algorithm, wherein the query template is schema-free and without a query binary code;

generating at runtime, by a static query generator executed on the computer system, a static query using the query template and input metadata;

generating, by a binary code generator based on a type check or a semantic check, binary code for the static query;

generating, by a calculator executed on the computer system, a signature for the binary code of the static query, wherein the signature is representative of the input metadata and a name of the static query;

storing, by the static query generator, the query template, the signature and the binary code in a computer memory;

invoking, by a template engine executed on the computer system, the query template, wherein the invoking the query template is performed at runtime, wherein the invoking the query template comprises receiving a call from a device for creating the static query;

determining when the received call is a first time call for the creating of the static query, if the received call is the first time call, then creating the static query, and otherwise retrieving the static query from a storage by matching the signature, in response to the call, to name of the static query and input metadata; and running, by a query engine executed on the computer system, the binary code of the static query represented by the signature to output a query result.

2. The method of claim 1, wherein the query template uses parameters for all vertex/edge type pattern positions.

3. The method of claim 1, further comprising using a dummy schema to check correctness of type, semantic, and syntax of the query template.

4. The method of claim 3, wherein the dummy graph schema has the minimum information that the graph algorithm uses.

5. The method of claim 3, further comprising validating a topology traversal, validating a read attribute of a graph element, and validating a write attribute of the graph element.

6. The method of claim 1, further comprising sending the static query to a compiler to do the type check and the semantic check.

7. The method of claim 1, further comprising:
generating the binary code for the query template;
calculating a hash value encoding a query name, a metadata parameter, and a query text; and
storing the hash value in a storage.

8. The method of claim 7, further comprising:
providing a query based on the query template to a query engine; and
outputting the query result from the query engine.

9. A system comprising:
a query template generator configured to create a query template using a dynamic query syntax for a graph algorithm, wherein the query template is schema-free and without a query binary code;
static query generator configured to generate, at runtime, a static query using the query template and input metadata;
a binary code generator configured to generate binary code for the static query based on a type check or a semantic check;
a calculator to generate a signature for the binary code of the static query, wherein the signature is representative of the input metadata and a name of the static query;
a computer memory configured to store the query template, the signature and the binary code; and
a query engine configured to:
invoke the query template, wherein the invoking the query template is performed at runtime, wherein the invoking the query template comprises receiving a call from a device for creating the static query;
determine when the received call is a first time call for the creating of the static query, and if the received call is the first time call, then creating the static query, and otherwise retrieving the static query from a storage by matching the signature, in response to the received call, to name of the static query and input metadata; and
run the binary code of the static query represented by the signature to output a query result.

10. The system of claim 9, further comprising a query template invocation engine configured to invoke the query template.

11. The system of claim 10, wherein invoking the query template is performed at runtime and further comprises a static query generator configured to receive a call for generating a static query and creating the static query.

12. The system of claim 11, further comprising a compiler configured to do a type check and a semantic check on the static query.

13. The system of claim 12, further comprising:
a binary code generator configured to generate the binary code for the query template;
a hash value calculator configured to calculate a hash value of query template name and query metadata, and static query text; and
the query engine configured to receive a query based on the query template and output the query result.

14. A system comprising:
at least one processor; and
a non-transitory computer readable medium comprising instructions that, when executed by the at least one processor, cause the system to:
create, by a query template generator, a query template using a dynamic query syntax for a graph algorithm, wherein the query template is schema-free and without a query binary code;
generate, by a static query generator at runtime, a static query using the query template and input metadata;
generate, by a binary code generator based on a type check or a semantic check, binary code for the static query;
generate, by a calculator executed on the computer system, a signature for the binary code of the static query, wherein the signature is representative of the input metadata and a name of the static query;
store the query template, the signature and the binary code in a computer memory;
invoke, by a template engine, the query template, wherein the invoking the query template is performed at runtime, wherein the invoking the query template comprises receiving a call from a device for creating the static query;
determine when the received call is a first time call for the creating of the static query, and if the received call is the first time call, then creating the static query, and otherwise retrieving the static query from a storage by matching the signature, in response to the call, to name of the static query and input metadata; and run, by a query engine executed on the computer system, the binary code of the static query represented by the signature to output a query result.

15. The system of claim 14, further comprising instructions that, when executed by the at least one processor, cause the system to:

send the static query to a compiler to do the type check and the semantic check;

generate the binary code for the query template;

calculate a hash value for the query template invocation parameters;

store the hash value in a storage; and generate and output the query result based on a query and based on the query template.

* * * * *